April 23, 1929.  H. W. LATIMER  1,710,456
SHEARS
Filed Feb. 23, 1927
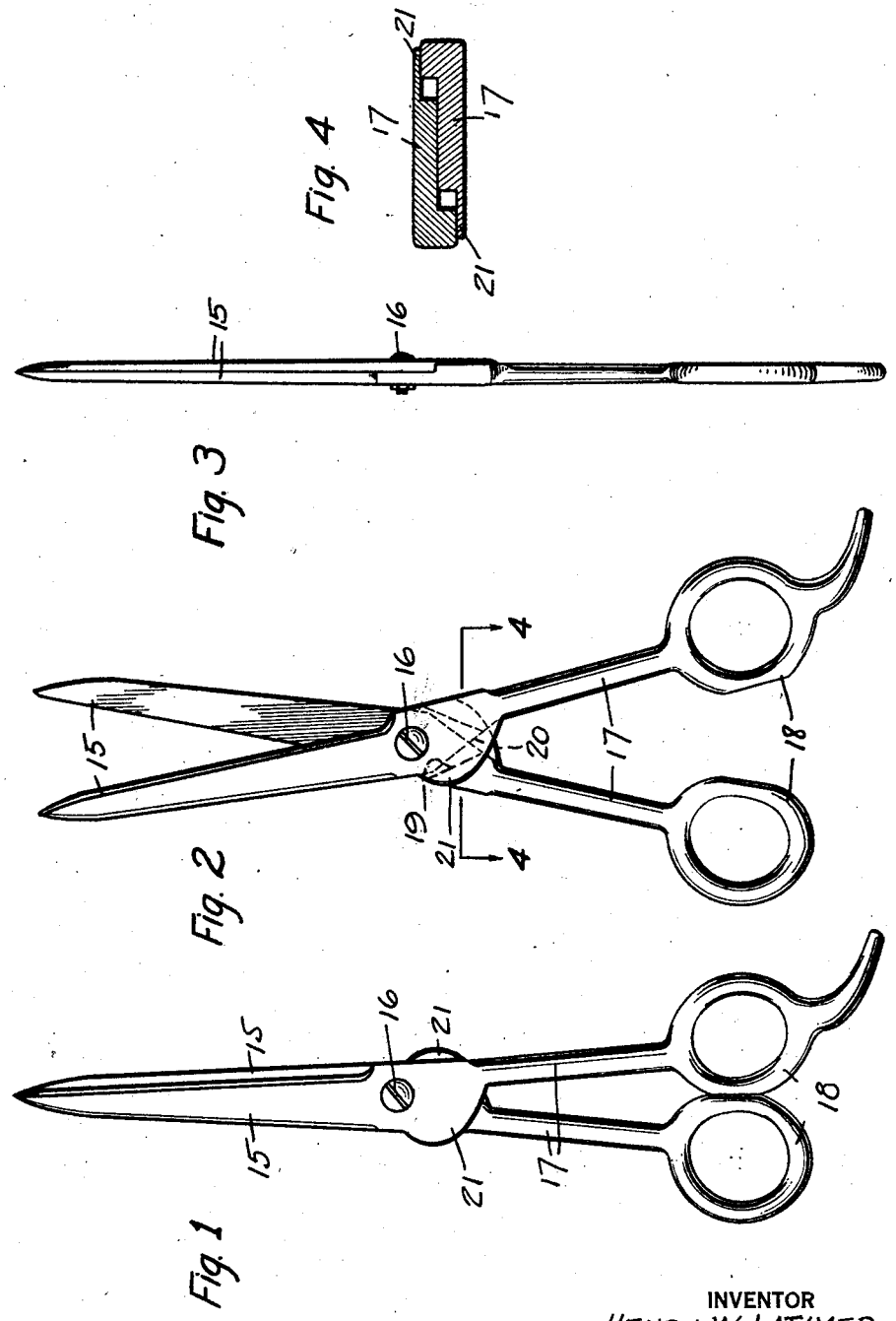
INVENTOR
HENRY W. LATIMER
BY
ATTORNEY Patented Apr. 23, 1929.

1,710,456

UNITED STATES PATENT OFFICE.

HENRY W. LATIMER, OF SAN PEDRO, CALIFORNIA.

SHEARS.

Application filed February 23, 1927. Serial No. 170,266.

My invention relates generally to shears, and particularly, although not necessarily, to barbers' shears, as used in cutting hair. In shears of this character, which embody crossed and pivoted blades having arms provided with finger loops, there is formed at the junction of the blades and arms shoulders which are moved toward and away from edges on the blade during the normal operation of the shears to set up a cutting or punching action on any object interposed between the two which, in practice, frequently pinches or cuts the ears of the person whose hair is being cut.

It is a purpose of my invention to provide a pair of shears which are constructed to form guards for the aforementioned shoulders and edges which permit the normal operation of the shears in the cutting of hair but prevent the shoulders and edges cutting or pinching the ears or any other part of the head.

I will describe only one form of shears embodying my invention and will then point out the novel features thereof in the claim.

In the accompanying drawings,

Figure 1 is a view showing in front elevation and in closed position one form of shears embodying my invention;

Figure 2 is a view similar to Figure 1 with the shears in open position;

Figure 3 is a view showing the shears in edge elevation;

Figure 4 is a transverse sectional view taken on the line 4—4 of Figure 2.

Referring specifically to the drawings, my invention, in its present embodiment, is shown incorporated in a pair of shears of conventional form in that they include blades 15 crossed and pivoted on a screw 16 and provided with arms 17 terminating in finger loops 18. The arms 17 are relatively thick as compared to the blades 15 and at their points of junction with the latter they are provided with diagonal shoulders 19 which, in the closed position of the blades are adapted to abut diagonal edges 20 of the blades 15.

In my invention, the edges 20 are substantially half the thickness of the edges of the conventional shears to make provision for flanges or extensions 21. These extensions are of sufficient area to cover the shoulders 19 when the shears are in open position, as illustrated in Figure 2, in order that the recess or gap between the shoulders and edges 20 will be at all times spanned. Thus, in actual use, the extensions in overlying the shoulders 19 prevent the ears or any other object being caught between the shoulders and edges and thus cut or pinched during the normal operation of the shears in cutting the hair. The extensions being disposed substantially in the same plane as that of the blades provides at the opposite sides of the shears relatively smooth and uninterrupted surfaces that in no way interfere with the normal operation of the shears yet at the same time rendering the shoulders and edges ineffective to operate any accidental injury to the ears or other parts of the head.

Although I have herein shown and described only one form of shears embodying my invention, it is to be understood that various changes and modifications may be made therein without departing from the spirit of the invention and the spirit and scope of the appended claim.

I claim as my invention:

Shears having a pair of crossed and pivoted blades terminating at one of their ends in arms constituting handles by which the blades can be manipulated to co-operate in effecting a shearing cut, the confronting sides of the blades and arms for interjunction of the blades with each other, the fitting of the blades forming a shoulder recessing of the blades forming a shoulder on each blade co-operating with an edge of the other blade to form a space or gap when the blades are open, into which objects are adapted to be received and subjected to pinching or cutting during the closing movements of the blades, and a lateral extension on the outer side of each blade, projecting from said edge of the latter and overlying the shoulder of the other blade to such extent when the blades are open, that the extensions will span said spaces or gaps and thereby prevent an object from being received in the latter and pinched or cut during closing movement of the blades.

HENRY W. LATIMER.